(12) United States Patent
Wu

(10) Patent No.: US 7,936,669 B2
(45) Date of Patent: May 3, 2011

(54) SYSTEMS AND METHODS FOR FLOW CONTROL AND QUALITY OF SERVICE

(75) Inventor: Zong Liang Wu, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 136 days.

(21) Appl. No.: 12/179,454

(22) Filed: Jul. 24, 2008

(65) Prior Publication Data

US 2009/0303876 A1    Dec. 10, 2009

Related U.S. Application Data

(60) Provisional application No. 61/058,853, filed on Jun. 4, 2008.

(51) Int. Cl.
*H04L 12/26* (2006.01)
(52) U.S. Cl. ........................................ 370/229
(58) Field of Classification Search .................. None
See application file for complete search history.

(56) References Cited

U.S. PATENT DOCUMENTS

| | | | | |
|---|---|---|---|---|
| 5,720,032 A * | 2/1998 | Picazo et al. | ................ | 709/250 |
| 6,956,818 B1 * | 10/2005 | Thodiyil | ................ | 370/230 |
| 2002/0091826 A1 * | 7/2002 | Comeau et al. | ................ | 709/226 |
| 2002/0126677 A1 * | 9/2002 | Hathaway et al. | ........ | 370/395.64 |
| 2003/0112817 A1 * | 6/2003 | Woo et al. | ................ | 370/413 |
| 2003/0174652 A1 * | 9/2003 | Ebata | ................ | 370/235 |
| 2004/0179476 A1 * | 9/2004 | Kim et al. | ................ | 370/230 |
| 2005/0239474 A9 * | 10/2005 | Liang | ................ | 455/454 |
| 2006/0268709 A1 * | 11/2006 | Singla et al. | ................ | 370/235 |
| 2008/0034054 A1 * | 2/2008 | Stehley et al. | ................ | 709/213 |
| 2009/0110110 A1 * | 4/2009 | Kyusojin | ................ | 375/295 |

* cited by examiner

*Primary Examiner* — Kevin C Harper
(74) *Attorney, Agent, or Firm* — Bruce W. Greenhaus

(57) ABSTRACT

Various embodiments of methods and systems for pausing and shaping data flow while supporting both parameterized and prioritized Quality of Service are disclosed. In some embodiments, a system for pausing and shaping data flow comprises an input buffer, a first pause controller coupled to the input buffer and an output buffer for flow control messages. Various embodiments also include a hop-1 buffer coupled to the input buffer and a hop-2 buffer comprising a plurality of queues coupled to the hop-1 buffer. Additionally, in some embodiments, a second pause controller is coupled to the queues. The second pause controller selects a queue or queues that will cause a pause to be generated based on a predetermined condition. A two-hop process controller controls the data packet flow from the input buffer to the hop-1 buffer and from the hop-1 buffer to the hop-2 queues based on packet classification.

21 Claims, 13 Drawing Sheets

| 6-Bytes | 6-Bytes | 2-Bytes | 2-Bytes | 2-Bytes | 42-Bytes |
|---|---|---|---|---|---|
| Destination MAC Address | Source MAC Address | Length/Type | MAC Control Opcode | MAC Control Parameters | Reserved |
| 01-80-C2-00-00-01 or the receiving node's MAC address | The transmitting Node's MAC address | 802.3 MAC Control 88-08 | PAUSE 00-01 | PAUSE time 00-00 to FF-FF | All zeros |

*Fig. 8*

*Prior Art*

Format I:

| 6-Bytes | 6-Bytes | 2-Bytes | 2-Bytes | 2-Bytes | 42-Bytes | | |
|---|---|---|---|---|---|---|---|
| Destination MAC Address | Source MAC Address | Length/Type | MAC Control Opcode | MAC Control Parameters | Pri | Reserved | |
| 01-80-C2-00-00-01 or the receiving node's MAC address | The transmitting Node's MAC address | 802.3 MAC Control 88-08 | PAUSE 00-01 | PAUSE time 00-00 to FF-FF | 0 to F | All zeros | |

*Fig. 9*

Format II:

| 6-Bytes | 6-Bytes | 2-Bytes | 2-Bytes | 2-Bytes | 42-Bytes |
|---|---|---|---|---|---|
| Destination MAC Address | Source MAC Address | Length/Type | MAC Control Opcode | MAC Control Parameters | Reserved |
| 01-80-C2-00-00-01 or the receiving node's MAC address | The transmitting Node's MAC address | 802.3 MAC Control 88-08 | PAUSE 00-01 01-xx | PAUSE time 00-00 to FF-FF | All zeros |

*Fig. 10*

| MAC Control Opcode | Type of Pause |
|---|---|
| 00-01 | IEEE standard Pause frame |
| 00-02 to 00-06 | Reserved for IEEE standards |
|  |  |
| 01-0x | Defined for Entropic for Selective Pause frame |
| 01-00 | Pause frame for QoS Class 0 |
| 01-01 | Pause frame for QoS Class 1 |
| 01-02 | Pause frame for QoS Class 2 |
| 01-03 | Pause frame for QoS Class 3 |

*Fig. 11*

*Prior Art*

SYSTEMS AND METHODS FOR FLOW
CONTROL AND QUALITY OF SERVICE

CROSS-REFERENCE TO RELATED
APPLICATIONS

This application claims priority from U.S. Provisional Patent Application Ser. No. 61/058,853 filed Jun. 4, 2008, which is incorporated herein by reference in its entirety.

TECHNICAL FIELD

The present method and apparatus relates to methods and systems for data processing and quality of service in electronic devices and in some embodiments, data processing and quality of service in network of electronic devices.

DESCRIPTION OF THE RELATED ART

FIG. 1 is a diagram illustrating a typical Ethernet network 100. Referring now to FIG. 1 the network 100 is located, for example, in a home 102. Such networks may also be located in business buildings, other structures or across multiple structures. The network 100 is made up of two or more devices such as computers 104 and 106 that are connected by a cable such as the CAT 5 cable 108 illustrated in the diagram. Ethernet is a frame-based computer network technology used in local area networking, as illustrated in FIG. 1. The Ethernet standard is defined by a number of wiring and signaling standards for the physical layer, through methods of network access at the Media Access Control (MAC)/Data Link Layer, and a common addressing format.

A full-duplex Ethernet network comprises two nodes. Each node can transmit and receive simultaneously. Such a network includes a flow control mechanism for temporarily stopping the transmission of data in a given direction on the network. When using the full-duplex Ethernet protocol, flow control resides on the data link layer. When a situation arises in which a sending computer is transmitting data faster than some other part of the network can accept it, a receiving network device sends a pause frame. The pause frame halts the transmission of the sender for a specified period. For example, in some cases, a receiving computer or a receiving port of an Ethernet switch might not be able to keep up with a sending computer. Accordingly, the receiving computer or receiving port of an Ethernet switch can send a pause frame to the sending computer. The pause frame system used in Ethernet networks does not include a mechanism to implement quality of service for different classes of traffic, however. Using a standard pause frame is simply a stop/go system.

Quality of service (QoS) is a computer networking and telecommunication network term that refers to resource allocation control mechanisms. QoS is the ability to provide different priority to different applications, users, or data flows, or to guarantee a certain level of performance to a data flow. Because the full-duplex Ethernet pause system completely stops the transmission of data, irrespective of data classes and their respective performance requirements, it is impossible to guarantee a certain level of performance as defined by the QoS.

With the many continued advancements in communications and data transfer technology, more and more devices are being introduced in both the consumer and commercial sectors with advanced, high bandwidth communications capabilities. Additionally, advances in processing power and low-power consumption technologies have led to the proliferation of communications capabilities in various products on a widespread basis.

To address the growing demand for a digital home networking market, a consortium of industry leading companies formed the Multimedia over Coax Alliance, or MoCA™. The MoCA protocol distributes digital entertainment over available bandwidth on the coaxial cable that is installed in households for cable or satellite TV service. The initial MoCA specification was approved in February 2006, and routers with built-in MoCA capabilities, MoCA set-top boxes and MoCA adapters followed shortly thereafter.

Other communication networks geared toward the home include: power line communication networks, which carry data over home electrical wiring (e.g., HomePlug Powerline Alliance or Universal Powerline Association); HPNA networks, which carry data over telephone wiring; and wireless networks such as those specified by IEEE 802.15.1 (BlueTooth®), IEEE 802.11 (WiFi), IEEE 802.16 (WiMax) and IEEE 802.15.1 (ZigBee).

In some cases, electronic devices such as home networking devices use Ethernet or other networking protocols to send and receive information. In some networking protocols, such as, for example, Ethernet, flow control can be an important consideration. Without flow control, data may be lost. For example, a transmitting device may send data to a receiving device when the receiving device's buffer is full. Accordingly, this incoming data may be lost because the device has no additional memory to use for storage. Alternatively, the device may overwrite older data in the buffer and this older data may be lost.

Various systems use flow control to control when data is transmitted and when data is not transmitted. For example, some networking systems' may use a pause mechanism to pause the transmission of data when a buffer on a receiving device is full or nearly full. One example flow control system is defined by the Institute of Electrical and Electronic Engineers (IEEE) 802.3 standard for a full-duplex Ethernet network where the MAC of a receiver regulates the transmission of data from the MAC of a transmitter by using a standard pause frame. IEEE 802.3 defines a standard Media Independent Interface (MII)/Gigabit Media Independent Interface (GMII). The flow control mechanism as defined by the IEEE is logically between the transmitter's MAC and the receiver's MAC, and the pause frame can be seen as exiting the data receiver's xMII (MII, GMII and their variations) and entering the data transmitter's xMII. This xMII-based flow control mechanism between two separate devices can be extended to the case where xMII interface is used between a host component and an interface component of one physical device.

In one example device, the mechanism can be implemented in a MoCA System on Chip (SoC) using, for example, Ethernet xMII connectivity between the SoC and the Host Processor. The Host Processor and the SoC communicate through the xMII interface. The interface between a host processor and an SoC is commonly called a host interface. Other example interfaces include, but are not limited to the PCI interface, Motorola 68 k-style interface, Intel-style interface, etc.

The xMII interface in this example device is a host interface. The Host Processor has an Ethernet MAC block, while the SoC has a hardware block emulating the Ethernet PHY (physical layer), so that the host interface uses the xMII protocol. When the Host Processor needs to transmit packets to another Host Processor in another network node, the Host Processor passes these packets to the SoC's PHY emulator through the xMII interface. The Ethernet PHY emulator in the SoC then passes the packets to the MoCA transmitter block in the SoC, which then transmits the packets over the MoCA network using MoCA protocol.

The MoCA SoC's Ethernet PHY emulator block has a Receive First-in-First-Out Memory (Rx FIFO) and a Transmit First-in-First-Out memory (Tx FIFO). The Rx FIFO has a high watermark and a low watermark. In some examples, the high watermark is an indication of when a FIFO is nearly full. It may, however, be selected to indicate other levels of memory usage based on the specific implementation. Similarly, the low watermark can be an indication of when a FIFO is nearly empty. It may, however, be selected to indicate other levels of memory usage based on the specific implementation.

The data packets in the Rx FIFO are classified and transferred into appropriate MoCA interface transmitter queues (Tx queues) as required to support QoS over MoCA network. This can be done using a micro-controller in the SoC and its associated Direct Memory Access (DMA). This micro-controller is referred to as the Data Interface Control (DIC) Traffic Controller (TC).

If one MoCA Tx queue is full, the DIC TC/DMA will be stalled, so that the Ethernet PHY block Rx FIFO will accumulate packets from the host. Eventually this can cause the high watermark to be crossed. In order to prevent the FIFO overflow, a pause frame is automatically triggered and sent to the Host Ethernet MAC to request a pause. In some systems, the IP core can queue the pause frame to the Ethernet PHY block Tx FIFO. Because it takes some time between when the high watermark is crossed and the Host Ethernet MAC is actually stopping traffic at xMII (MII, GMII or some variations of them) interface, there needs to be enough buffer space in the Ethernet PHY block Rx FIFO to accommodate the data packets that are arriving during this pause latency. To allow for this latency, an overflow protection buffer can be used. The overflow protection buffer can be part of the Ethernet PHY block Rx FIFO or a separate buffer.

After the xMII is paused, the time to stop the pause and get back to the un-paused state will need to be determined. The pause state is referred to as Xon and the state when not paused is referred to as Xoff. In some examples, the end of the pause state is determined using the low watermark. For example, when the amount of data in the Ethernet PHY block Rx FIFO drops below the low watermark, the Xoff Pause frame is triggered automatically by the hardware, and is queued to the Ethernet PHY block Tx FIFO. The low watermark defines the underflow protection buffer size. The MoCA Tx capability is proportional to the ratio of the EffectiveTxBufferSize to the Latency. The EffectiveTxBufferSize is the effective MoCA Tx line buffer, in other words, the part that actually contains data to be sent. The Latency is within a certain range for a given network configuration. This means that the Ethernet PHY block Rx FIFO may be temporarily empty without influencing the MoCA Tx throughput, as long as the MoCA Tx line buffer (Tx queues) is full or contains enough data to send. To achieve the maximum MoCA Tx throughput, it is necessary to keep data in the MoCA Tx line buffer in order to avoid a delay in the MoCA Reservation Requests for packets to send. The Ethernet PHY block Rx FIFO should have enough stored data to continue to feed the MoCA Tx line buffer while the flow control mechanism is in the process of resuming to Xoff state.

To reduce the latency of the Xoff and Xon pause frame, it can be useful to reduce the amount of data in the Ethernet PHY block Tx FIFO when xMII flow control is done. On the other hand, for the MoCA interface Rx path, in some examples, double (or greater) buffering may be used with the Ethernet PHY block Tx FIFO. This can be done so that there is not an overly stringent requirement on the transfer path from the MoCA interface Rx line buffer to the Ethernet PHY block Tx FIFO. In some cases, this may maximize the MoCA Rx to Ethernet PHY block Tx throughput. This means that the Ethernet PHY block Tx FIFO should be large enough to contain two packets.

Because there are typically four QoS queues in the MoCA Tx block, there are several choices that a system designer needs to make. If a system triggers the Xon when any queue is full, then other non-full queues will see their throughput interrupted. For example, a low priority queue may trigger the Xon, so that packets for all priority queues, including higher priority queues, cannot come in from the host. In some cases, this may interrupt packets of parameterized QoS flows. On the other hand, if a system allows only the parameterized QoS flow queues to trigger a pause, then if a lower priority queue is full before the parameterized QoS flows its incoming packets will be dropped.

BRIEF SUMMARY OF EMBODIMENTS

The present method and apparatus relates to methods and systems for communication and more particularly, some embodiments relate to methods and systems for pausing and shaping data flow between a transmit component, for example, a host, and a receive component, for example, an SoC. The host and SoC can be in a network device. Some embodiments relate to methods and systems for pausing and shaping data flow between a transmit network device and a receive network device. Two or more network devices form a communication network. One such example communication system is Multimedia over Coax Alliance (MoCA), where a network device may include a host and an SoC, and where the interface between the two is a slave interface like xMII. In various embodiments, MoCA may co-exist with Community Antenna TV, or Cable TV (CATV) and Fiber to the Home (FTTH) systems. It might also be used in other home networking applications. In various embodiments, a system for pausing and shaping data flow comprises an input buffer, a first pause controller coupled to the input buffer and an output buffer for flow control messages. Some embodiments also include a hop-1 buffer coupled to the input buffer, a hop-2 buffer comprising a plurality of queues coupled to the hop-1 buffer; and a second pause controller coupled to the plurality of queues. The second pause controller selects a queue that can cause a pause to be generated based on a predetermined condition. In some embodiments, a two-hop process controller controls the data packet flow from the input buffer to the hop-1 buffer and from the hop-1 buffer to the hop-2 queues based on packet classification.

In some embodiments, the systems further comprise assigning a priority to a queue and pausing based on the priority of the queue. Additionally, some embodiments are configured to transmit a pause frame that includes class of data traffic information. In this way, the priority of the queue can be assigned based on the class of data traffic that is being received by the queue. Some embodiments are further configured to transmit information indicating which queue is generating a pause.

Various embodiments include a system for pausing data flow. The system may include a data receiving device that includes an input buffer, a first pause controller coupled to the input buffer, a plurality of queues coupled to the input buffer; a second pause controller coupled to the plurality of queues, and an out buffer used to send flow control messages between the transmit device and the receive device. In some embodiments, the second pause controller can cause a pause to be generated based on a predetermined condition, for example, the status of plurality of the queues. Additionally, a data transmit device configured to transmit data to the input buffer is used in various embodiments.

Some embodiments assign a priority to a queue and pausing based on the priority of the queue. For example, the second pause controller can be configured to transmit a pause frame that includes class of data traffic information. The priority of the queue can then be assigned based on the class of data traffic that is being received by the queue. In some embodiments, the second flow controller is further configured to transmit information indicating which queue is generating a pause. Additionally, the data transmit device may be further configured to pause a specific data stream. For example, the data transmit device may be further configured to pause a data stream according to its pre-allocated budget, or to transmit data for each of a plurality of queues at the same rate that the data is actually consumed by each of the plurality of queues of the receive device. Additionally, in various embodiments, a data transmit device and a receiving device may communicate using out-of-band messaging or in-band messaging.

In various embodiments, a method of pausing data flow comprises receiving data at an input buffer and controlling the flow of data from the input buffer into a plurality of queues. For example, this may be done either directly or through another intermediate step (hop-1). In some embodiments, this facilitates packet classification by a microcontroller. Additionally, this can also facilitate selecting a queue that can cause a pause to be generated based on a predetermined condition. The method may further comprise assigning a priority to a queue and generating a pause based on the priority. The priority can also be assigned based on the class of traffic being received by the queue. In some embodiments, the method further comprises communicating a pause signal to a transmitting device or causing the transmitting device to pause a specific data stream.

Other features and aspects of the method and apparatus will become apparent from the following detailed description, taken in conjunction with the accompanying drawings, which illustrate, by way of example, the features in accordance with embodiments of the method and apparatus. The summary is not intended to limit the scope of the invention, which is defined solely by the claims attached hereto.

BRIEF DESCRIPTION OF THE DRAWINGS

The method and apparatus, in accordance with one or more various embodiments, is described in detail with reference to the following figures. The drawings are provided for purposes of illustration only and merely depict typical or example embodiments. These drawings are provided to facilitate the reader's understanding of the method and apparatus and shall not be considered limiting of the breadth, scope, or applicability of the claimed invention. It should be noted that for clarity and ease of illustration these drawings are not necessarily made to scale.

FIG. 8 is a table illustrating an example standard pause frame format.

FIG. 9 is a table illustrating an example pause frame format in accordance with the systems and methods described herein.

FIG. 10 is another table illustrating an example pause frame format in accordance with the systems and methods described herein.

FIG. 11 is a table illustrating example MAC control opcodes.

The figures are not intended to be exhaustive or to limit the method and apparatus to the precise form disclosed. It should be understood that the method and apparatus can be practiced with modification and alteration, and that the invention is limited only by the claims and the equivalents thereof.

DETAILED DESCRIPTION OF THE EMBODIMENTS

Figure 1:
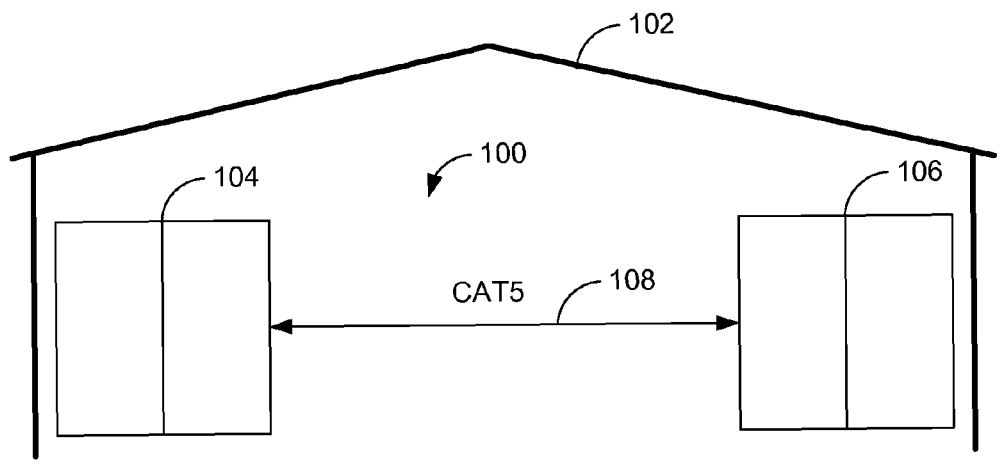
FIG. 1 is a diagram illustrating a typical Ethernet network.
Figure 2:
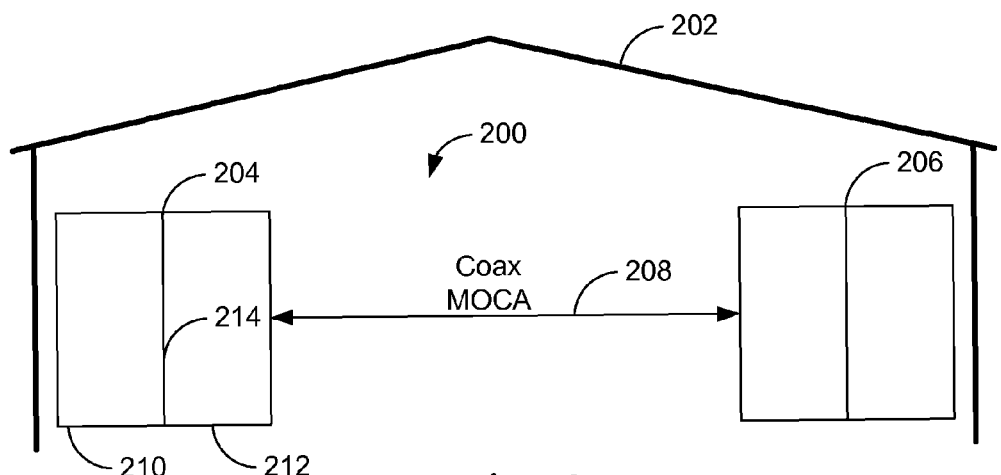
FIG. 2 is a diagram illustrating a Multimedia over Coax Alliance (MoCA) network.

FIG. 2 is a diagram illustrating a Multimedia over Coax Alliance (MOCA) network 200. Referring now to FIG. 2, the network 200 is located, for example, in a home 202. Such networks may also be located in business buildings, other structures or across multiple structures. The network 200 is made up of two or more electronic devices 204 and 206. These electronic devices 204 and 206 include, without limitation, computers, set top boxes, digital video recorders, televisions, stereos, CD players, DVD players or other electronic devices that might transmit and receive signals over the MoCA network. These devices 204 and 206 are connected by a cable such as the coax cable 208 illustrated in the diagram. It will be understood, however, that other types of connections might also be used and other types of networking protocols other than MoCA, like HPNA or Homeplug AV, might be used. In some cases, coax may already be available, pre-installed, in some homes. The electronic devices 204 and 206 include a host portion 210 and a MoCA SoC portion 212, illustrated with respect to device 204.

The MoCA SoC can "simulate" an Ethernet connection with the host 210. In other words, from the perspective of the host 210 the SoC 212 appears to be an Ethernet network connection. This is because at the host interface 214, the MoCA SoC behaves like an Ethernet device. The connection between two or more electronic devices 204 and 206 is a MoCA connection, however, not an Ethernet connection.

For example, in various embodiments, the host 210 has an Ethernet MAC block at the interface 214, while the SoC, at least at the interface, acts like an Ethernet layer 1, PHY device. Accordingly, in some embodiments, the low-level control signals between the host 210 and SoC 212 are the same as in an Ethernet MAC/PHY interface using xMII (including MII, GMII, and other variations of these). A MoCA device may simulate or emulate Ethernet behavior for the MAC side at the host interface, for example.

In various embodiments, the SoC includes buffers and logic that are used to perform a pause similar to a standard pause mechanism defined by the IEEE802.3. The system may also include various flow control methods for QoS. For example, some embodiments of the systems and methods described herein-include a two-hop process, which includes a hop-1 buffer and a plurality of hop-2 queues supporting selective pause. Additionally, in some embodiments, in-band or out-of-band messaging is used to send, to a transmitting device, information indicating how much data space is available in each queue. Further, in some embodiments, a host 210 may enable the MoCA SoC 212 to make MoCA reservation requests for data packets to be transmitted over MoCA without actually transmitting the data to the SoC 212. This can be done by first sending the packet descriptors of these data packets to the MoCA SoC 212. The data may then be transmitted from the host to the SoC closer to the actually scheduled MoCA transmission time so that less data storage might be used in the SoC 212. For example, some embodiments might wait a fixed period of time or until receiving confirmation of a pending transmission from MoCA scheduler. Various MoCA devices might use one or more of these systems and methods to improve QoS in a MoCA system.

Figure 3:
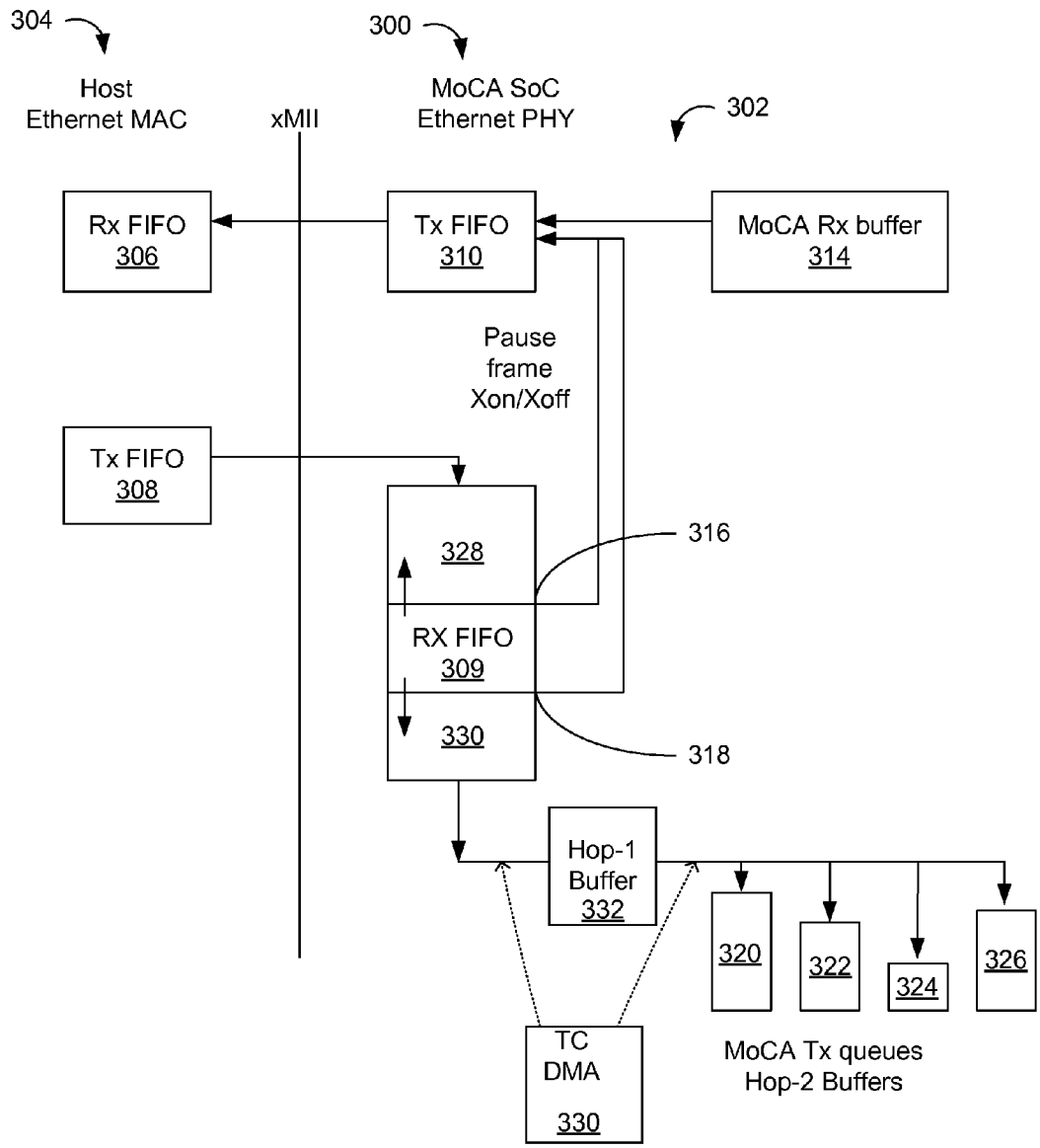
FIG. 3 is a diagram illustrating an example implementation of a communications system in accordance with the systems and methods described herein.

FIG. 3 is a diagram illustrating an example implementation of a communications system in accordance with the systems and methods described herein. Referring now to FIG. 3, various embodiments of flow control with selective pause can be implemented using a pause frame to carry the information regarding which class of traffic needs to be paused. For example, in a MoCA network with four classes of QoS (Parameterized QoS, high priority, medium priority, low priority), the selective pause frame sent from the MoCA SoC 302 to the outside host MAC 304 contains an indicator telling which class of traffic the host MAC 304 needs to pause. Accordingly, the host MAC 304 can pause the flow of data from a Tx FIFO 308.

As illustrated in FIG. 3, the SoC 302 includes a buffer 309 that is used to generate standard pause frames. The buffer 309 is also known as the SoC's Ethernet PHY block Rx FIFO. It is an Ethernet PHY level emulation buffer. (It makes the SoC 302 appear to be an Ethernet PHY to the host system 304.) The SoC 302 also includes MoCA Transmit (Tx) queues 320, 322, 324 and 326. These queues 320, 322, 324 and 326 are the hop-2 queues. In other words, they are the second level queues after the buffer 309 and hop-1 buffer 332.

When the Host Ethernet MAC sends data to the SoC, the buffer 309 is filled from the bottom up, so that when the high watermark 316 is crossed, a standard Xon pause frame is generated to the host MAC to pause the transmitter. When the data packets are transferred from the buffer 309 and the low watermark 318 is crossed, a standard Xoff pause frame is generated to the host MAC to resume the transmission. Depending on how promptly the data packets in the Rx FIFO are transferred out (to hop-1 buffer and then to MoCA Tx queues), the high watermark is triggered more or less frequently. Because the standard Xon pauses frame stops all the traffic, the throughput of the xMII interface from the host MAC to the SoC is reduced in proportion to the pause duration.

In order to achieve high throughput over the xMII, high watermark 316 crossings should be limited by quickly transfer data packets out of the buffer 309. In one embodiment, a two-hop process is used. The data packets from the buffer 309 are first transferred into the hop-1 Buffer 332. In some embodiments, this can be done under the control of DIC TC and DMA 330, which sets up packet descriptors and associated buffer space for a group of data packets in advance. When the DMA has actually transferred some data packets into the hop-1 buffer 332, their ownership semaphore is switched to the DIC TC 330, and the DIC TC 330 then does packet classification of these packets and transfers them into the MoCA Tx queues 320, 322, 324, 326 according to their respective QoS levels.

In various embodiments, the Ethernet PHY hardware that automatically generates the standard Pause frame is still working as before. In MII mode where the MoCA network throughput for a given node can be much higher than the MII throughput, the buffer 309 may often be close to empty. In some embodiments, this is because there is an overflow protection buffer for each MoCA Tx queue 320, 322, 324 or 326. This is also because the DIC TC/DMA may transfer packets from the buffer 309 to the hop-1 and then to the MoCA Tx queues 320, 322, 324 or 326 much faster than the host 304 can write to that Rx FIFO through MII. Accordingly, in one embodiment, in MII mode, the standard hardware Pause might only be triggered rarely. In GMII, where the host MAC 304 can write packets to the buffer 309 much faster than the MoCA Tx queues 320, 322, 324 or 326 can deplete from it, the Standard Pause will regulate the GMII interface with standard Xon/Xoff.

In various embodiments, a system for pausing and shaping data flow may also comprise an output buffer. This buffer may be used to send flow control messages. In some embodiments, other outputs can also be sent using the output buffer.

Figure 4:
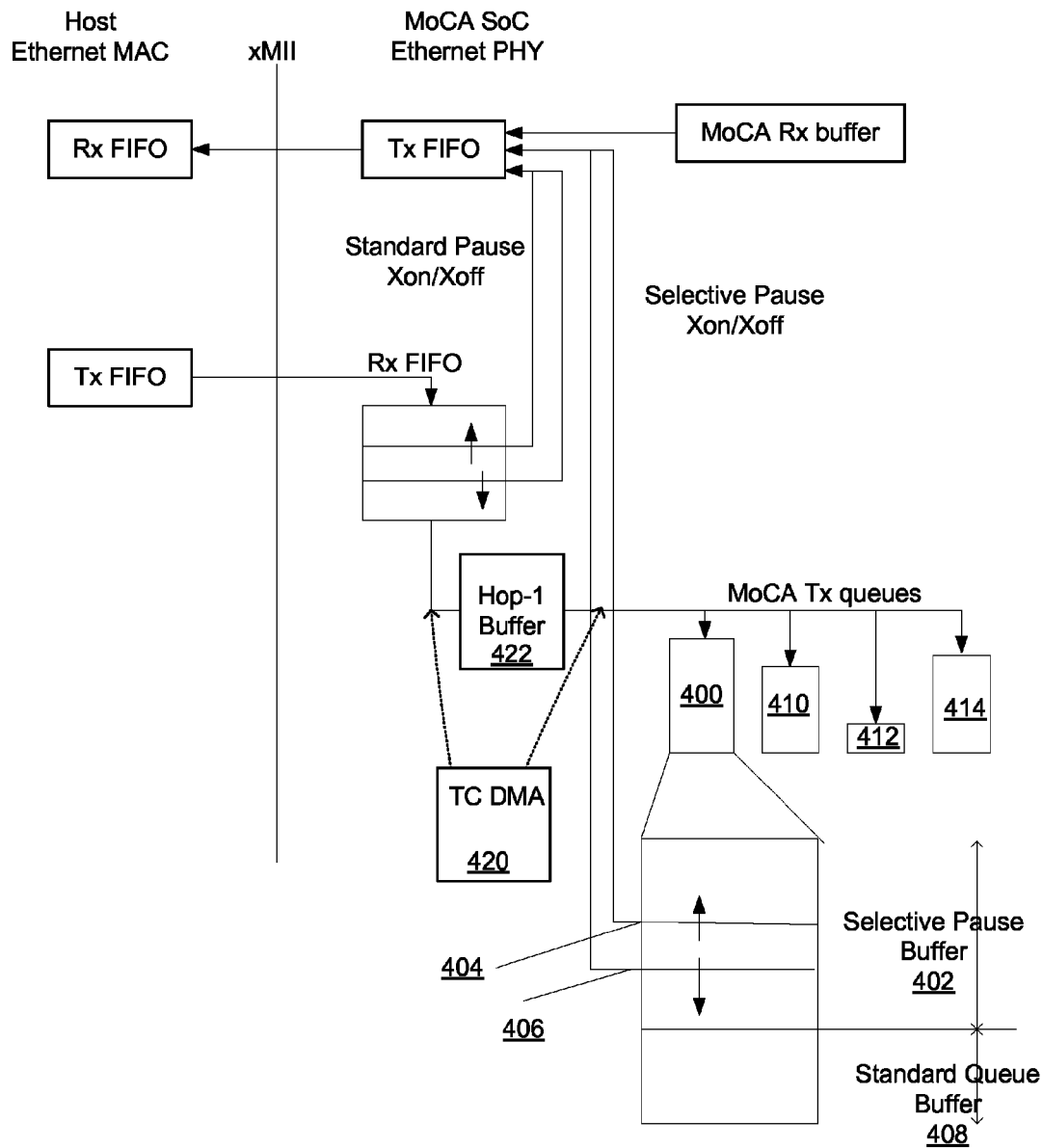
FIG. 4 is a diagram illustrating additional details of selective pausing in accordance with the systems and methods described herein.

FIG. 4 is a diagram illustrating additional details of selective pausing in accordance with the systems and methods described herein. Referring now to FIG. 4, additional details of the MoCA Tx queues 400, 410, 412, 424 are discussed. These MoCA Tx queues are collectively called the hop-2 buffer. Each MoCA Tx queue 400, 410, 412, 424 can be considered as the sum of a standard queue buffer 408 and a selective pause control buffer 402. The selective pause control buffer 402 includes a high watermark 404 and low watermark 406. These may function similarly to the high and low watermarks 316 and 318 illustrated in FIG. 3 that are implemented in the buffer 309. For example, in some embodiments, the DIC TC 420 monitors how full each MoCA Tx queue is. As a queue fills, when the high watermark 404 is crossed, the DIC TC 420 will generate a Selective Pause Xon frame (to suspend the host transmit for this queue). As a queue is emptied, when the low watermark 406 is crossed, the DIC TC 420 will generate a Selective Pause Xoff frame (to resume the host transmit for this queue).

In various embodiments, the Selective Pause frames (Xon and Xoff) include the QoS level of the corresponding MoCA Tx queue. In some embodiments, the high watermark 404 indicates when a MoCA Tx queue 400 is full or near full and the host should stop sending more data for this queue. The low watermark 406 indicates when a MoCA Tx queue 400 has decreased to such a level that the host should resume sending more data to this queue. It will be understood by one of skill in the art, however, that the state of the queue 400 that triggers a high or low watermark 404 or 406 can vary from implementation to implementation.

Figure 5:
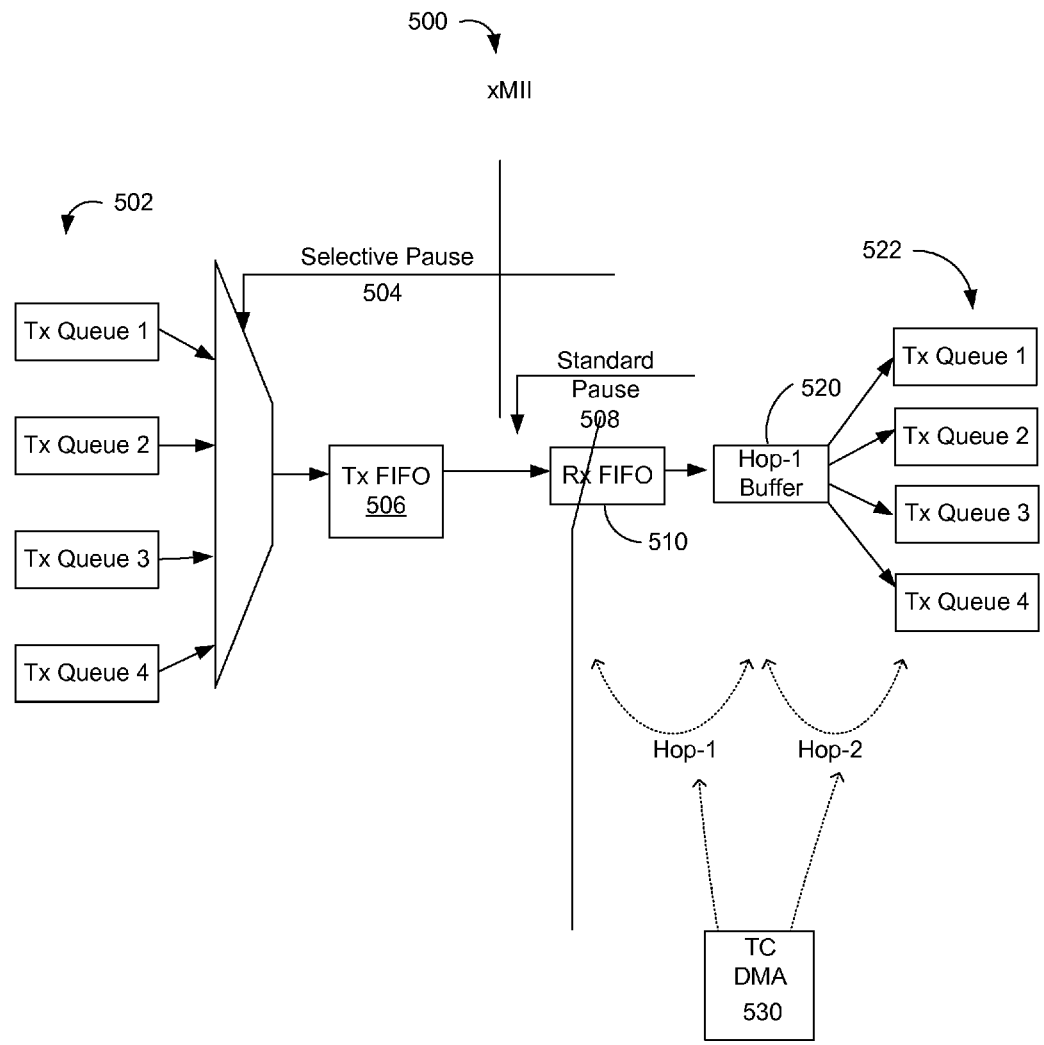
FIG. 5 is a diagram illustrating an example implementation of a selective pause system in accordance with the systems and methods described herein.

FIG. 5 is a diagram illustrating an example implementation of a selective pause system in accordance with the systems and methods described herein. Referring now to FIG. 5, various embodiments of the systems and methods described herein include a selective pause. For example, in some systems, the host Tx queues 502 can be paused using selective pause 504. Alternatively, the pause may occur at the output of the Tx FIFO 506 using a standard pause 508. In other words, data transmitted from the Tx FIFO 506 can be paused using a standard pause frame when the RX FIFO 510 is full or near full. In various embodiments, the Standard Pause frame controls the xMII gate, while the Selective Pause frame controls the mixing of host MAC's 502 Tx queues.

In some embodiments, selective pause 504 can pause individual queues 502 while standard pause 508 pauses the data stream after the Tx FIFO 506. The standard pause pauses the entire data stream from the Tx FIFO 506 rather than just one or more queues 502.

In various embodiments, each application QoS level uses a packet queue 502 in the host. A host Tx Queue 506 is a linked packet descriptor list that defines the packets to be transmitted to the SoC. These packets are listed in time order. The host driver can build this Tx Queue 506 in different ways. In various embodiments, host transmit traffic shaping is done. For example, the traffic shaping may be based on feedback from the SoC so that the SoC MoCA Tx queues (hop-2 queues) 522 are used efficiently, e.g., without either dropping packets or disrupting flows. The Selective Pause mechanism described herein is one form of the feedback from the SoC.

FIG. 5 also illustrates the two-hop process in the SoC. In the two-hop process, the data packets from the host MAC received by the SoC Ethernet PHY block Rx FIFO 510 are first transferred into the hop-1 buffer 520 under the control of the DIC TC DMA 530. In various embodiments, the DIC TC 530 is a programmable microcontroller that sets up in advance packet descriptors and associated memory space for packets from the host transmitter and the Rx FIFO 510. When these packets are actually received by the hop-1 buffer 520, the DIC TC 530 checks these packets and classifies them according to their QoS level, and then sets up the DMA, which transfers the packets into their corresponding MoCA Tx queues (hop-2 buffer) 522.

Note that hop-1 and hop-2 may consist of either actual packet movement from one physical place to another or just changes in packet descriptors and data pointers, or both. This two-hop approach allows the DIC TC 530 to handle the packet classification, movement, efficient management of the MoCA Tx queues 522 and data flow control with the host through various methods, without imposing stringent requirements including the timeliness and speed on the DIC TC 530.

Figure 6:
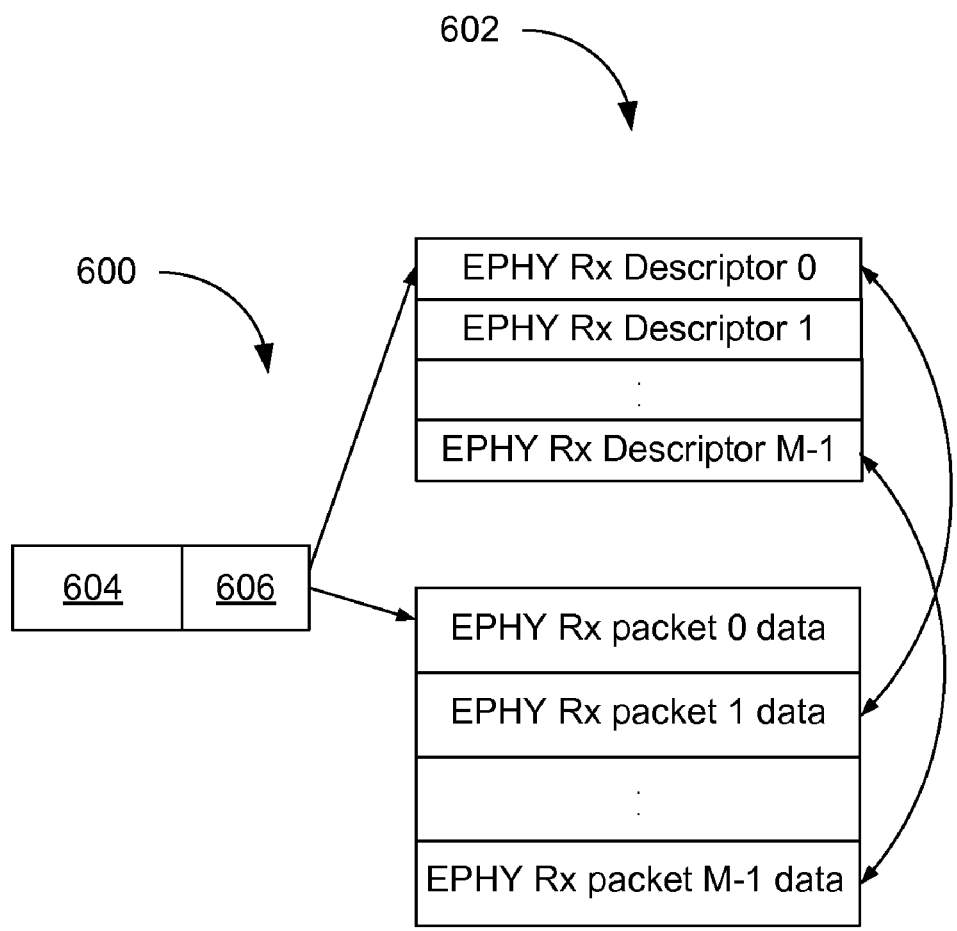
FIG. 6 is a block diagram illustrating an example first hop in a two-hop process in accordance with the systems and methods described herein.

FIG. 6 is a block diagram illustrating an example first hop in a two-hop process in accordance with the systems and methods described herein. Referring now to FIG. 6, a first hop occurs from the SoC Ethernet PHY block 600 to the hop-1 Buffer 602. In various embodiments, one queue is used for all traffic. For example, the SoC has an interface hardware block called Ethernet PHY block 604. The Ethernet PHY block 604 manages interface communication with the host Ethernet MAC. When the host Ethernet MAC sends packets to the SoC through the interface, the Direct Memory Access (DMA) 606 of the SoC transfers these packets into the hop-1 buffer of the SoC 602. This hop-1 buffer 602 consists of a number of Receive Descriptors, each describing one packet to be received. The number of Receive Descriptors illustrated in FIG. 6 is represented by the variable "M." The DMA 606 is controlled through these receive descriptors. An example of the format of the Receive Descriptor is shown below in Table 1:

TABLE 1

| Bit31 | Bit30:0 | |
|---|---|---|
| OWN | status | |
| Bit31:22 | Bit21:11 | Bit10:0 |
| ControlBits | reserved | BufferSize |
| BufferAddress | | |
| NextDescriptorAddress | | |

In some embodiments, a queue of Receive Descriptors is set up by the embedded software and reused repetitively. The received packet is stored by the DMA in a buffer pointed to by BufferAddress field. The buffer size is defined by the BufferSize field, which, in some embodiments is 11 bits. Accordingly, up to 2048 bytes can be addressed. The NextDescriptorAddress points to the next Receive Descriptor.

Figure 7:
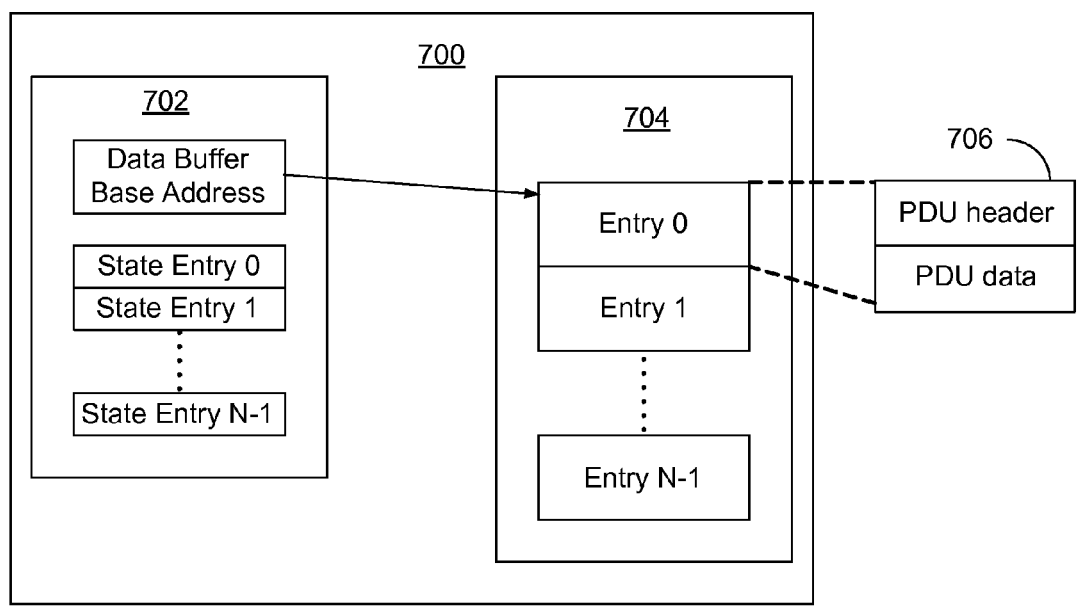
FIG. 7 is a block diagram illustrating an example second hop in a two-hop process in accordance with the systems and methods described herein.

FIG. 7 is a block diagram illustrating an example second hop queue in a two-hop process in accordance with the systems and methods described herein. This is also referred to as the hop-2 queue. Referring now to FIG. 7, in various embodiments, when a packet is transferred into the hop-1 buffer 602 from the Ethernet PHY block Rx FIFO, the corresponding descriptor's OWN bit is handed over to the Data Interface Control (DIC) Transfer Controller (TC). The TC then checks the packet's header to do packet classification and sets up the DMA to transfer the packet into the corresponding MoCA Tx queue 700. There is one MoCA Tx queue 700 for each MoCA network QoS level. For example, one Tx queue 700 is used for the Parameterized QoS flows and one for each of MoCA prioritized QoS levels. Three MoCA prioritized QoS levels are used in some embodiments. The size of the Tx queue 700 is configurable by the host software, the microcontrollers on the SoC, or both. The MoCA Tx queue 700 is also called MoCA Line Buffer 700 because it is used by the MoCA transmitter for transmitting the packets over the MoCA network.

In various embodiments, the MoCA Tx Line Buffer 700 consists of a Buffer Descriptor 702 and an Entry Queue 704. The Buffer Descriptor 702 contains the configuration and state information of the Line Buffer 700. In some embodiments, the entry queue 704 is a circular buffer consisting of a fixed number of entries 706, each of fixed size called Packet Data Unit (PDU) size. The size of the entry queue 704 determines the maximum achievable transmit throughput because of the store-and-forward mechanism of the MoCA transmit operation.

FIG. 8 is a table illustrating an example standard pause frame format. Referring now to FIG. 8, IEEE 802.3 defines the standard pause frame for flow control for full-duplex Ethernet network. This frame can have a Destination MAC Address of 01-80-C2-00-00-01 or a receiving node's MAC address may be used. The source MAC address is the transmitting node's MAC address and the length and type of packet is an 802.3 MAC control 88-08. The pause is indicated using the MAC control opcode 00-01, and the pause time can be set from 00-00 to FF-FF. Additionally, 42-bytes are reserved and set to all zeros. In some embodiments, upon receiving a pause frame with pause time larger than zero, the receiving node will stop sending out any traffic, except the MAC control pause frames.

FIG. 9 is a table illustrating an example pause frame format in accordance with the systems and methods described herein. FIG. 10 is a table illustrating another example pause frame format in accordance with the systems and methods described herein. Referring now to FIGS. 9 and 10, in some embodiments, the Selective Pause frame has two configurable formats, with the difference being where the queue/ priority/QoS level information is conveyed. Format I is illustrated in FIG. 9 and Format II is illustrated in FIG. 10. Format I, as illustrated in FIG. 9 uses a byte in the 42 reserved bytes of a standard pause frame to allow for a selective pause. In various embodiments, the rest of the reserved bytes remain all zero. In some embodiments, the "Pri" byte illustrated in FIG. 9 is used to indicate the queue/priority or the QoS level of the queue requesting the pause. In various embodiments, other selective pause data might be transmitted in a similar way. For example, a packet might be used to transmit a number indicating which queue is sending the pause. Format II, as illustrated in FIG. 10 uses a new MAC op-code to indicate a selective pause. Any available unused op-code might be used, for example.

FIG. 11 is a table illustrating example MAC control op-codes. Referring now to FIG. 11, various embodiments of MAC Control op-codes that are used to carry the queue/priority/QoS level information for selective pause are described. In some embodiments, the MAC Control Parameters field defines the Pause time with a range from 00-00 to FF-FF units of time. For selective pause the mechanism can have 00-00 mean Xoff (restart the transmission), and have FF-FF mean Xon (stop the transmission). Additionally, in some embodiments, the Reserved field is used to carry the queue/priority/QoS level information instead of using the MAC Control op-code.

In various embodiments, the SoC may be configurable to work in the Extended Pause Frame mode and either in mode I or mode II, as defined above. Some embodiments initially use the standard Pause Frame mode. This allows different applications to choose the appropriate mode.

Figure 12:
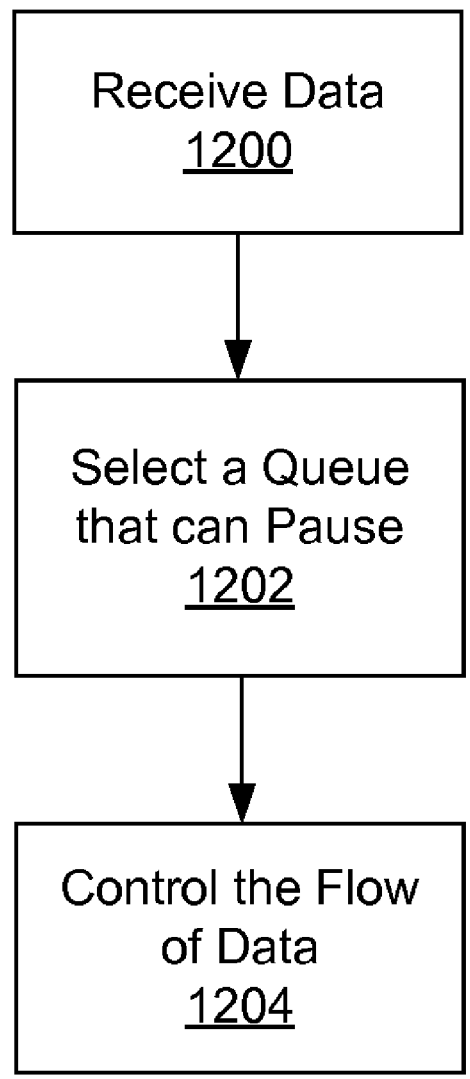
FIG. 12 is a flowchart illustrating a method in accordance with the systems and methods described herein.

FIG. 12 is a flowchart illustrating a method in accordance with the systems and methods described herein. Referring now to FIG. 12, in various embodiments, a method of pausing data flow comprises receiving data at an input buffer in a step 1200. A queue or plurality of queues that will cause a pause to be generated based on a predetermined condition are selected in a step 1202. The flow of data from the input buffer into a plurality of queues is controlled in a step 1204. Additionally, in some embodiments, the method further comprises assigning a priority to a queue and generating a pause based on the priority. The priority can be assigned, for example, based on the class of traffic being received by the queue. In some embodiments, the method further comprises communicating a pause signal to a transmitting device or causing the transmitting device to pause a specific data stream.

Figure 13:
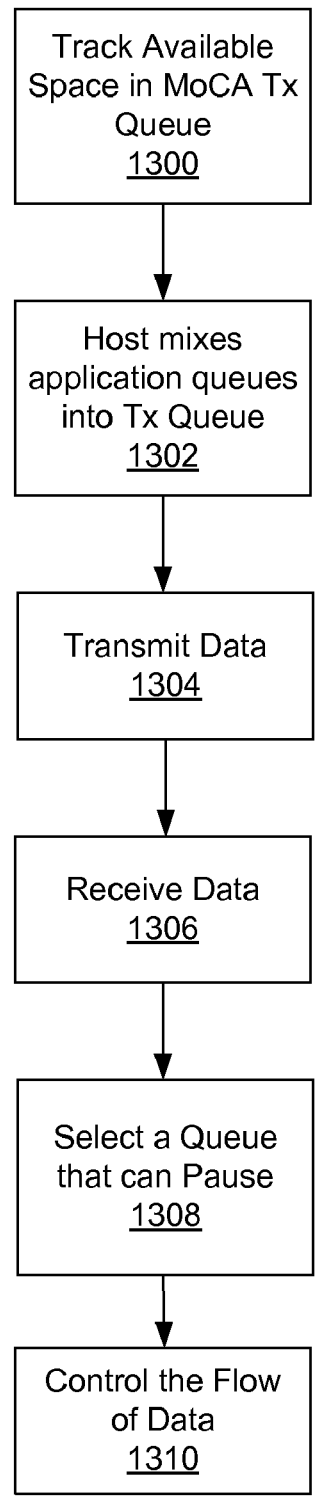
FIG. 13 is another flowchart illustrating a method in accordance with the systems and methods described herein.

FIG. 13 is another flowchart illustrating a method in accordance with the systems and methods described herein. Referring now to FIG. 13, some embodiments of the systems and methods described herein, support QoS by using an Ethernet driver for the host Ethernet MAC. For example, some systems perform traffic shaping using knowledge of the MoCA transmitter's actual activities. In other words, the traffic transmitted from the host to the SoC may be determined based on the MoCA transmitter's actual data use. In a step 1300 the space available in a MoCA Tx queue is tracked. In various embodiments, the MoCA Tx queue is a hop-2 queue. If the host Ethernet MAC driver builds its Tx Queue from its applications queues, without taking into account the current SoC queue states and the MoCA network's transmit grants of the node under consideration, there is risk of dropping packets or packet blocking.

In a step 1302, the host driver builds the host Tx Queue using information regarding the present status or immediate future status of the SoC MoCA Tx queues. Accordingly, it is less likely that the SoC queues for the incoming packets are full. Pause frames may still be triggered when some or all SoC queues are full or close to full, but this may not block time-sensitive packets because of the QoS admission process and guaranteed MoCA bandwidth for parameterized QoS.

In some embodiments, the SoC keeps track of the available space in each hop-2 queue. The host driver can get such information on a regular basis. For example, this information may be received every MoCA cycle, or every 1 ms, or a fraction of a millisecond. Additionally, the host driver can use such information to build the host Tx queue from all the host application queues. This will allow the host Tx queue to send as many packets for each application queue as can be sent without risking overrunning the hop-2 queue in the SoC. It will also avoid causing some hop-2 queues to trigger the selective pause or the standard pause. If the standard pause is triggered all data over xMII will be blocked.

In a step 1304, data is transmitted from the host Tx queue to the SoC's Ethernet PHY block Rx FIFO. This data is received in a step 1306. Because the transmit queue is filled using information about the status of the hop-2 queues and because the DMA can transfer data very quickly from the Ethernet PHY block Rx FIFO to the hop-1 buffer and then to the hop-2 queues, it is less likely that these queues will overflow or need to cause a Pause. In the event that flow control is needed, however, a pause can be generated by selecting a queue that can cause a Pause in a step 1308 and generating a pause in a step 1310.

In some embodiments, the host driver may get information about the MoCA Tx queue, e.g., the hop-2 queue, through either out-of-band messaging or in-band messaging. Out-of-band messaging uses the host diver to read registers on the SoC periodically. These registers contain the available space in each queue. Either they can be read through the Management Interface of the MII (MMI) or another available host interface. The process may be interrupt based or polling based. For example, some embodiments may generate an interrupt to the host driver whenever there is a predefined change in the available space of some queues. Various embodiments may use a polling based system. In such as system the host driver periodically polls the SoC for the message. For example, polling may occur every MoCA cycle. Some embodiments may use a combination of these systems.

In various embodiments, in-band messaging uses the SoC to send a message to the host driver using a local layer-2 message. This message can be sent periodically, for example, every MoCA cycle, or whenever there is a predefined change in the available space of some queues. In some embodiments, a one-hop link message with a known MAC address or a reserved MAC address understood by both the host and the SoC may be used. A filter in the host can be used to filter out these message packets.

In some embodiments, the in-band messaging may have a longer latency than the out-of-band messaging. This is because there is some latency for the SoC to send out the message packet and because there is some latency for the host filter to filter out these packets. Additionally, there is some latency between filtering out the packets and the use of the packets by the host driver. When the host driver gets the message about the SoC hop-2 queues, it needs some time to build the host Tx Queue and send the packets to the SoC through the xMII. Accordingly, the SoC hop-2 queues may have some empty space. In other words, the utilization of these queues may not be at their theoretical maximum because of latency.

In various embodiments, for the store-and-forward transmitter of the MoCA network, the maximum achievable transmit bandwidth is limited to the ratio between the queue size and the MoCA network latency. To improve the utilization of the SoC hop-2 queues, a system can anticipate the immediate future status of the queue based on the grants received for packets in this queue. For example, assume the host driver needs some number of milliseconds (X ms) to build its host Tx Queue based on the actual queue status at time T. In some embodiments, at time T the SoC message could anticipate this by telling the immediate future status of the queues at time T+X based on the grants received or the grants deemed to be received because of the bandwidth reservation made for this queue at the MoCA network scheduler.

In some embodiments, the packets from hop-1 are classified by the Transfer Controller (TC) based oil criteria like priority or flow ID, and are transferred into their corresponding hop-2 queues. Each hop-2 queue is individually configurable to trigger or not to trigger the selective or standard pause frame when it is full to avoid queue overrun and packet drop.

As discussed above, in various embodiments of the systems and methods described herein a two-hop process is used. The two-hop process can be implemented in a System-on-Chip (SoC)'s MoCA network transmit data path, where the SoC is connected to an external Ethernet MAC which may be part of either a host processor or an Ethernet switch, which sends Ethernet packets to the SoC. The interface between the Ethernet MAC and the SoC complies with the IEEE802.3 Media Independent Interface (MII) or the Gigabit Media Independent Interface (GMII) or some derivatives or variations of MII and GMII.

The same two-hop process can also be implemented when the SoC emulates the behavior of the Ethernet MAC and the host emulates the Ethernet PHY. One difference is at the xMII interface. At this interface, the signaling of xMII is reversed between the SoC and the host.

The selective pause mechanism described above can also be used by the host in the reverse direction, in other words, when the SoC is sending data packets to the host and the host wants to selectively pause certain categories of data packets that are received by the SoC from another MoCA network node. The host may be either a host processor or a port of an Ethernet switch. These selective pause frames are then used by the MoCA transmitter to flow control the traffic on the MoCA network. Additionally, the flow control and two-hop methods described herein are also applicable with other interfaces between a host and an SoC, for example Intel-style or Motorola-style slave interfaces, as well as many other interfaces that might be used with various systems and methods described herein.

The flow control and two-hop methods described herein are also applicable with other network interfaces. MoCA is just an example for illustrating the basic mechanism. Other networking technologies that may be applied to the systems and methods described here include, but are not limited to HPNA, HomePlug AV, and WiFi.

Figure 14:
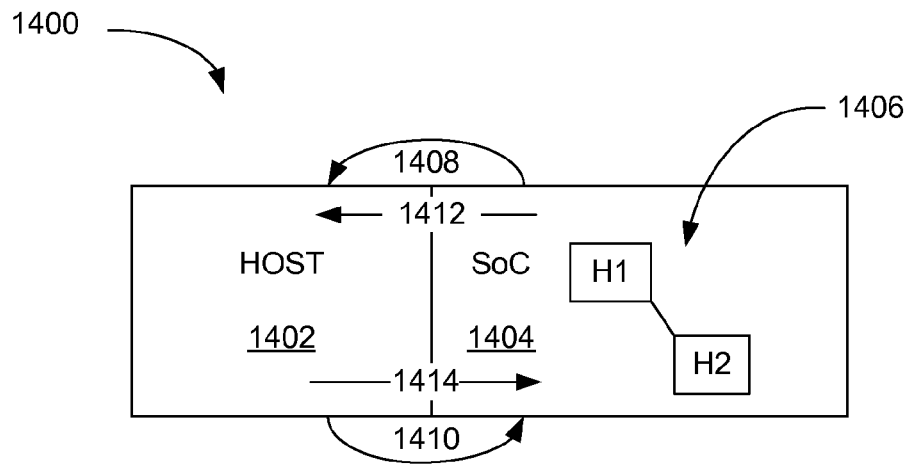
FIG. 14 is a diagram illustrating a method of flow control in accordance with the systems and methods described herein.

FIG. 14 is a diagram illustrating a method of flow control in accordance with the systems and methods described herein. Referring now to FIG. 14, a host 1402 and an SoC 1404 are illustrated. The SoC 1404 includes hop-1 and hop-2 queues 1406. As illustrated by FIG. 14, in some embodiments, out-of-band 1408, 1410, and in-band 1412 and 1414 messaging is used to communicate status and control. For example, a message may be sent to the host 1402 with data regarding how much buffer space is available in each queue. In this way, the host 1402 can have more control in shaping the traffic to the SoC. For example, it may only send packets that have available space in the queue.

In some embodiments, status is passed by allowing the host 1402 to read registers in the SoC 1404. These registers may be read across the host interface either in-band or out-of-band.

In various embodiments, status can be sent to the host 1402 or "pushed," either in-band or out-of-band. As discussed above the "in-band" data path refers to the regular data path for user data across the host 1402 SoC 1404 interface. Conversely, the "out-of-band" data path is any other data path, such as, for example, the MII management interface or some totally separate interface.

Figure 15:
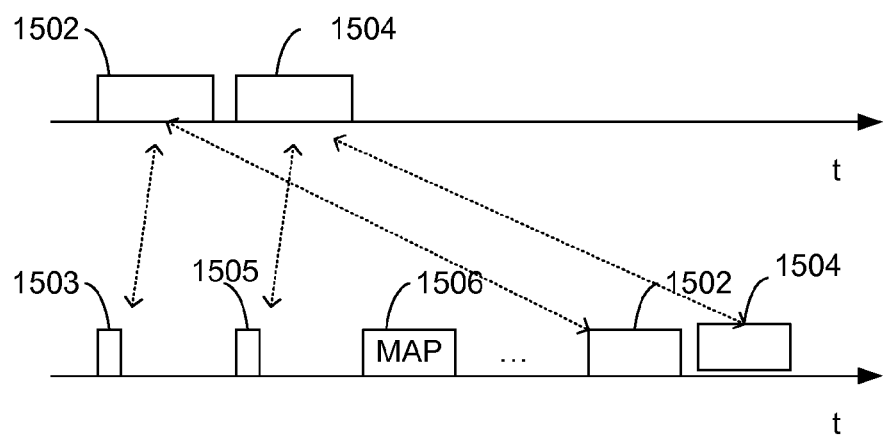
FIG. 15 is a diagram illustrating another method of flow control in accordance with the systems and methods described herein.

FIG. 15 is a diagram illustrating another method of flow control and QoS support in accordance with the systems and methods described herein. Referring now to FIG. 15, in some embodiments of the systems and methods described herein, data storage space in the SoC is conserved by reducing the storage time of data packets 1502, 1504 in the SoC. For example, in some embodiments storage time is reduced by transmitting first a packet descriptor for each of these data packets while delaying the transmission of the data packets themselves across the host interface.

Generally, data packets 1502, 1504 are transmitted to the SoC. (See the top graph of FIG. 15.) The SoC then makes MoCA reservation requests for these packets. The MoCA network coordinator schedules these packets, and the granted transmission time-slots over MoCA are sent to all the nodes in a scheduling packet called a MAP. The SoC MoCA transmitter then transmits these packets at scheduled time-slots. In the meantime, these packets are stored in the SoC. To reduce the SoC memory needed to store these packets, in some embodiments, the host first creates a Packet Descriptor 1503, 1505 for each of the data packets 1502, 1504 that are to be transmitted over MoCA network. The Packet Descriptors 1503, 1505 are transmitted to the SoC. The data packets 1502, 1504 are transmitted across the host interface latter. For example, in some cases, the data packets 1502, 1504 are transmitted after a MAP 1506 is received. The MAP indicates when the data packets 1502, 1504 will be transmitted across the MoCA network. In other embodiments, the data packets 1502, 1504 can be transmitted to the SoC after a predetermined period. For example, the transmission might occur without waiting for the MAP 1506 packet to be received. In various embodiments, the Packet Descriptors 1503, 1505 may include, without limitation, the destination MAC address of the data packet, the packet size and the QoS level.

Figure 16:
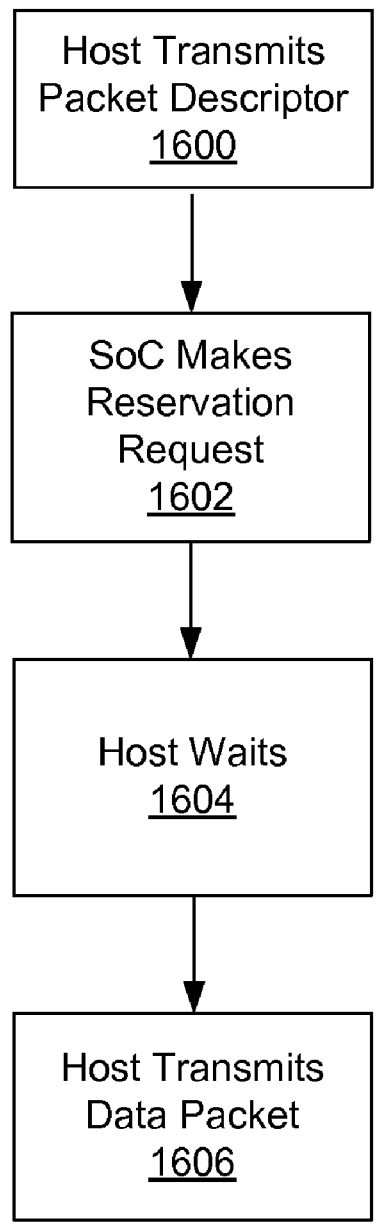
FIG. 16 is a flowchart illustrating a method in accordance with the embodiment of FIG. 15.

FIG. 16 is a flowchart illustrating a method in accordance with the embodiment of FIG. 15. In FIG. 16, a method of controlling data transmission between a host device and a network interface device includes a step 1600 of transmitting a Packet Descriptor 1503, 1505 from the host device to the network interface device. The network interface device (the first device) builds a reservation request for the data packet described by the Packet Descriptor 1503, 1505 and sends it to network scheduler (network coordinator in MoCA) device (the second network device). In a step 1604, the first device waits a period. This waiting period can be a predetermined period or based on receiving a scheduled network transmission time from the second network device. In a step 1606, the host of the first network device then transmits the data packet to the first network device across the host interface.

Various embodiments of the methods and systems described herein have been described in terms of interaction between a host component and a network interface component. These components have been described as being within the same network device. It will be understood by those of skill in the art, however, that the methods and systems are applicable for interaction between two separate network devices. For example, the systems and methods described herein may be used in conjunction with two MoCA network devices. With MoCA and other network technologies, the network nodes typically include a network device with a processor, controller or other processing module configured to perform device functions. The scheduling and other network management features discussed above might be performed by the device processing module, or a dedicated network module might be provided with the device to enable it to function as a network node.

While various embodiments of the present methods and systems have been described above, it should be understood that they have been presented by way of example only, and not of limitation. Likewise, the various diagrams may depict an example architectural or other configuration for the method and apparatus, which is done to aid in understanding the features and functionality that can be included in the method and apparatus. The method and apparatus is not restricted to the illustrated example architectures or configurations, but the desired features can be implemented using a variety of alternative architectures and configurations. Indeed, it will be apparent to one of skill in the art how alternative functional, logical or physical partitioning and configurations can be used to implement the desired features of the present method and apparatus. In addition, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

While MoCA is used in describing the network interface device and the SoC for illustration purposes, the method and apparatus described herein is not restricted to the illustrated example. The method and apparatus described herein can be used in other network nodes using network technologies such as HPNA, Homeplug AV, WiFi, etc.

As used herein, a controller might be implemented using a general-purpose or special-purpose processing engine such as, for example, a microprocessor, controller, or other control logic. In one embodiment, some or all of device functionality can be implemented using an ASIC, PLD or other circuit device, including a processor core and memory blocks. Accordingly, a controller might be implemented using a processing core such as, for example, a RISC microprocessor core. Examples of RISC processor cores include ARM cores available from Advanced RISC Machines Ltd, located in Cambridge, England, and MIPS RISC cores available from MIPS Technologies, Inc., of Mountain View, Calif., although other cores are available as well. In this example, the controller is connected to a bus or other communication medium to facilitate interaction with other components of the device. A central bus structure or other communication media and architectures are acceptable.

As used herein, the term module might describe a given unit of functionality that can be performed in accordance with one or more embodiments. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Although the method and apparatus is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments, whether or not such embodiments are described and whether or not such features are presented as being a part of a described embodiment. Thus, the breadth and scope of the present claimed invention should not be limited by any of the above-described exemplary embodiments.

Terms and phrases used in this document, and variations thereof unless otherwise expressly stated, should be construed as open ended as opposed to limiting. As examples of the foregoing: the term "including" should be read as meaning "including, without limitation" or the like: the term "example" is used to provide exemplary instances of the item in discussion, not an exhaustive or limiting list thereof, the terms "a" or "an" should be read as meaning "at least one," "one or more" or the like: and adjectives such as "conventional" "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the claimed invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for pausing data flow comprising:
an input buffer;
a first pause controller coupled to the input buffer;
a hop-1 buffer coupled to the input buffer;
a hop-2 buffer coupled to the hop-1 buffer, the hop-2 buffer including a plurality of queues;
a second pause controller coupled to the queues, the second pause controller selecting a queue that will cause a pause to be generated based on a predetermined condition; and
a two-hop process controller that controls a data packet flow from the input buffer to the hop-1 buffer and from the hop-1 buffer to the hop-2 queues.

2. The system of claim 1, further comprising assigning a QoS level to each of the hop-2 queues and pausing based on the QoS level of the queues.

3. The system of claim 2, wherein the second pause controller is configured to transmit a pause frame that includes class of data traffic information.

4. The system of claim 3, wherein the QoS level of the hop-2 queues is assigned based on the class of data traffic that is being received by each of the queues.

5. The system of claim 1, wherein the second pause controller is further configured to transmit information indicating which queue is generating a pause.

6. The system of claim 1, wherein the first pause controller generates a pause based on a predetermined condition.

7. The system of claim 1, wherein the two-hop controller controls the data packet transfer from the input buffer to the hop-1 buffer, the hop-1 buffer comprising a group of packet descriptors and associated memory space that is managed by the two-hop controller and used by a DMA to do the packet transfer.

8. The system of claim 1, wherein the two-hop controller controls the data packet transfer from the hop-1 buffer to the hop-2 buffer by classifying packets into the plurality of queues of the hop-2 buffer according to certain predetermined criteria.

9. A system for pausing data flow comprising:
a data receiving device including:
an input buffer;
a first pause controller coupled to the input buffer;
a hop-1 buffer coupled to the input buffer;
a hop-2 buffer coupled to the hop-1 buffer, the hop-2 buffer including a plurality of queues;
a second pause controller coupled to the queues, the second pause controller selecting a queue that will cause a pause to be generated based on a predetermined condition; and
a two-hop process controller that controls the data packet flow from the input buffer to the hop-1 buffer, and from the hop-1 buffer to the hop-2 queues; and
a data transmission device including:
a plurality of application queues;
a transmit queue, coupled to the application queue and configured to transmit data to a data receiving device; and
a data transmission controller, coupled to the application queues and the transmit queue, the data transmission controller configured to track memory space available in the data receiving device, multiplex packets from the application queues to the transmit queue and control when data is transmitted to the data receiving device based on the memory space available in the data receiving device.

10. The system of claim 9, further comprising assigning a priority to a hop-2 buffer queue and pausing based on the priority of the hop-2 buffer queue.

11. The system of claim 10, wherein the pause controller is configured to transmit a pause frame that includes class of data traffic information.

12. The system of claim 11, wherein the priority of a hop-2 buffer queue is assigned based on the class of data traffic that is being received by the hop-2 buffer queue.

13. The system of claim 9, wherein the flow controller is further configured to transmit information indicating which hop-2 buffer queue is generating a pause.

14. The system of claim 9, wherein the data transmit device is further configured to pause a specific data stream.

15. The system of claim 14, wherein the data transmit device is further configured to pause a data stream according to some predetermined budget.

16. The system of claim 14, wherein the data transmit device is further configured to pause a data stream with a certain QoS level according to feedback information from the data receive device.

17. The system of claim 16, wherein the feedback information is in the form of pause frames containing the QoS levels and a pause time.

18. The system of claim 16, wherein the feedback information is in the form of proprietary packets containing data selected from the group consisting of QoS levels, status of the hop-2 buffer queues and pause time.

19. The system of claim 9, wherein the data transmit device is further configured to transmit data for a hop-2 buffer queue at the same rate that the data is processed.

20. The system of claim 19, wherein the data transmit device and the receiving device communicate flow control information using out-of-band messaging.

21. The system of claim 19, wherein the data transmit device and the receiving device communicate flow control information using in-band messaging.

* * * * *